Patented July 10, 1951

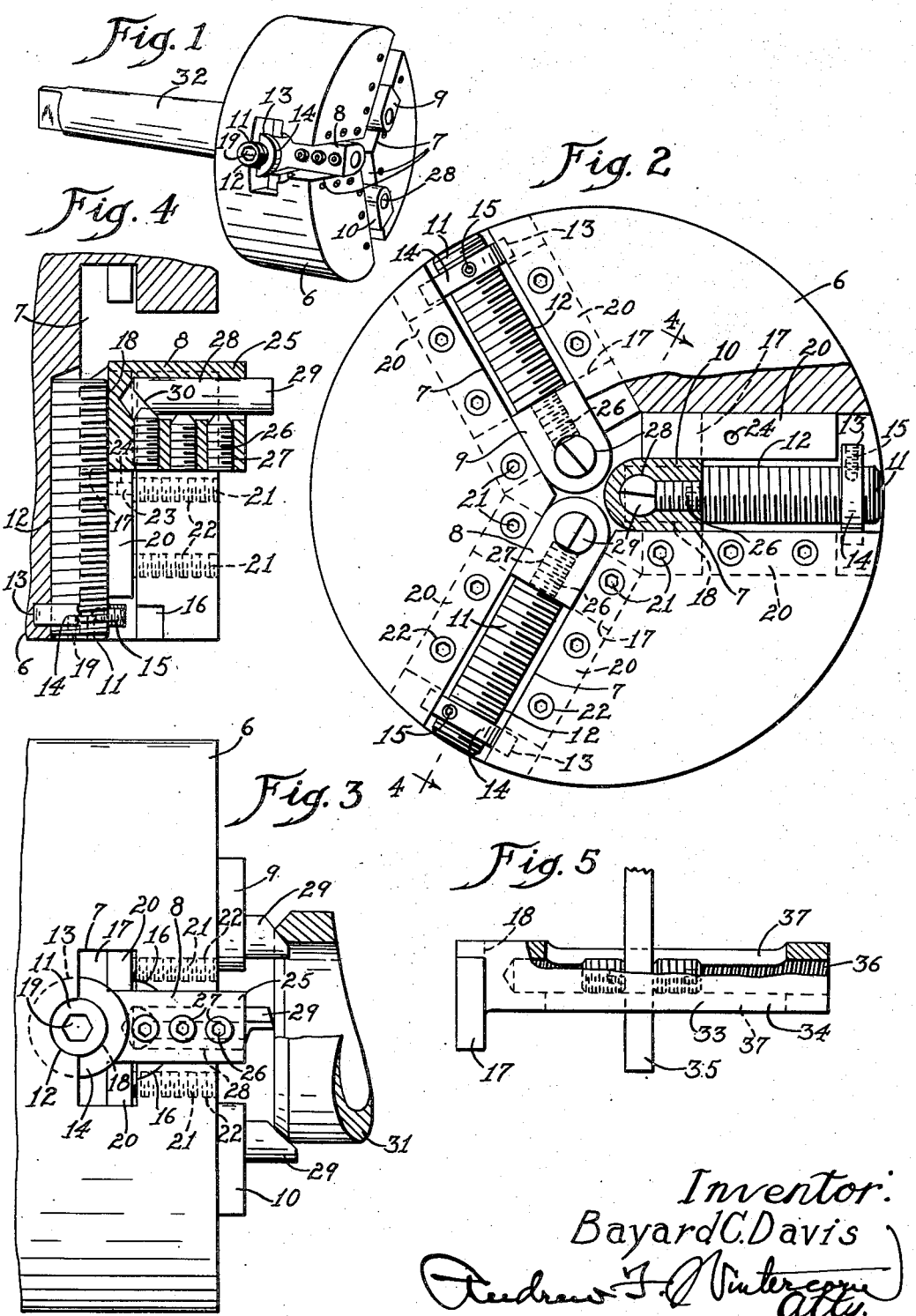

2,559,950

UNITED STATES PATENT OFFICE 2,559,950

TRIPLE-TOOL TURNING HEAD

Bayard C. Davis, Rockford, Ill.

Application February 20, 1948, Serial No. 9,687

1 Claim. (Cl. 29—97)

This invention relates to tool holding chucks and is more particularly concerned with a new and improved turning head embodying three tool holders, independently adjustable radially to permit simultaneously:

(a) centering, drilling, and chamfering;

(b) facing, chamfering on inside diameter and chamfering on outside diameter;

(c) boring, facing, and chamfering, and performing many other machining combinations, using standard tool bits, the head being so designed that it is adapted for use handily on turret lathes, milling machines, single and double spindle profilers, and various turning machines.

One of the important novel features of the head is the way each tool holder is independently adjusted radially by an adjusting and locking screw, and then, when the desired adjustment is reached, gibs that were loosened to permit the adjustment are tightened again to lock the tool holder to the screw as well as to the main body, this double locking action positively insuring the tool holder keeping its adjustment.

Another important novel feature is the deep seating and precision fitting of the tool holders in the main body which makes for further insurance against loss of adjustment when the gibs are tightened and avoids likelihood of tool chatter. The special T-slot construction also makes for wide work capacity—a 5-inch head, for example, accommodating work 0 to 3½-inch diameter, and reversing of the tool holders in the slots increasing the range to 4-inch diameter. The tool holders are also interchangeable in said T-slots, and holders can be used with tools held at 45°, permitting operation on tubes of small inside and outside diameters, holders for boring tools being also available for use on this head.

Still another important novel feature is the provision in each tool holder of a rear screw operating with its pointed inner end against the bevelled end of the tool bit for axial adjustment, this adjustment feature taken with the radial adjustment for the tool holder itself making for greatly reduced setup time.

Finally, another worthwhile feature is that of keeping all parts within the outside diameter of the main body, for safety in operation. Thus, the radial adjustment screws are fixed radially relative to the body with their hexagonally socketed outer ends, that are adapted to receive a hexagonal wrench for adjustment, within the radius of the main body.

The invention is illustrated in the accompanying drawings, in which—

Fig. 1 is a perspective view of a triple-tool turning head made in accordance with my invention;

Fig. 2 is a front or face view of the same turning head on a larger scale, substantially full size, with a portion of the main body broken away to permit showing one of the locking gibs in elevation and indicating at the same time the way in which these gibs cooperate with the tool holders;

Fig. 3 is a side view of the turning head of Fig. 2 showing how the three tool bits thereof can be used for simultaneously facing the end of a piece of work while chamfering on the outside and inside diameters;

Fig. 4 is a sectional detail on the line 4—4 of Fig. 2, and

Fig. 5 is an isolated view of a tool holder for a boring operation designed to be used in this turning head interchangeably with any one of the tool holders of Figs. 2-4.

The same reference numerals are applied to corresponding parts throughout the views.

The present chuck or head comprises a cylindrical body 6 having three radial T-slots 7 provided therein in the front face, spaced 120° apart, in which three tool holders 8, 9, and 10 are arranged to be adjusted independently by means of screws 11. At the base of each T-slot and on the center line thereof is a half-round smooth groove 12 elongated to substantially the full length of the slot and adapted to receive a screw 11 with a close working fit, the screw extending substantially the full length of the groove 12, as appears in Fig. 4. There is a half-round smooth groove 13 concentric with and of larger radius than the groove 12 provided in the outer end portion thereof to receive a thrust ring 14 threaded on and pinned to the outer end portion of the screw 11, as by a screw 15 entered in registering radial holes in the ring and screw. Cut-outs 16 in the outer ends of the T-slots at the inner ends of the narrow portion of the slots are deep enough to enable entering the rings 14 in the grooves 13. The tool holders 8—10 have T-shaped inner end portions 17 slidable in the base portions of the T-slots, and these inner end portions have half-round grooves 18 extending transversely thereof which are threaded to match the threads of the screws 11 so that the tool holders can be adjusted radially by turning the screws, each screw having a hex-socket 19 in the outer end thereof adapted to receive a wrench for such adjustments.

Gibs 20 extend lengthwise of the opposite sides of the T-slots and bear on the side portions of the T-shaped inner end portions 17 of the tool holders to clamp the tool holders in adjusted positions, there being three screws 21 threaded in parallel holes 22 provided in the body 6 on each side of each T-slot arranged to be tightened against the gibs for this clamping action. One of the screws 21 of each set of three has a reduced inner end portion 23 received in a hole 24 provided in the associated gib to prevent endwise displacement of the gibs from the slots when the screws are loosened enough to permit in or out adjustment of the tool holders.

The slots 7 are fairly deep and the main body portion 25 of each tool holder is accordingly elongated, as clearly appears in Figs. 3 and 4, for wider area of engagement, the tool holders also fitting closely in the slots whereby to eliminate likelihood of tool chatter and also reduce danger of loss of adjustment. Three screws 26 are threaded in each tool holder body in parallel holes 27 provided in longitudinally spaced relation to the bore 28 provided for the tool bit 29. The innermost one of the three screws 26 has its pointed inner end bearing against the bevelled inner end 30 of the tool bit for close and quick axial adjustment, the other two screws serving when tightened, after the desired adjustment of the first mentioned screw, to fasten the bit firmly in adjusted position. Now, it will be clear that the radial and axial adjustment of each tool holder and its bit can be made independently of the adjustments of the other tool holders and bits. Thus, in Fig. 3 the bit 29 in holder 8 is set for a facing operation on the end of the work 31; the bit 29 in holder 9 is set for a chamfering operation on the internal diameter, and bit 29 in holder 10 is set for a chamfering operation on the external diameter, and the three turning operations are done simultaneously. The construction obviously makes for wide work capacity, a 5-inch head, for example, accommodating 0 to 3½-inch diameters, and reversal of the holders in the T-slots serving to increase the range in such a head to 4 inches. The micrometer type adjustments of the bits and holders insure close accuracy and yet these adjustments take only a small fraction of the time heretofore allowed for set-ups. Furthermore, standard tool bits can be used, meaning a big saving in tool costs. The one turning head constructed as herein disclosed, is capable of doing the work of a large number of standard or specially designed tools as brought out in the opening paragraph of this specification. The tapered coaxial shank 32 that is fastened to or integral with the body 6 enables mounting the tool on any one of a large variety of machines, some of which were specifically mentioned in said opening paragraph. In passing, it is worth noting that all of the screws 11 are within the outside diameter of the head, for safety in operation.

In conclusion, it should be clear that the tool holders 8—10 are not only adjustable easily, and reversible, but are also interchangeable. Thus, although all of the holders have bits disposed in bores parallel to the axis of the head, other holders may be furnished with bits held at 45°, permitting operations on tubes of small inside and outside diameters. Also, as shown in Fig. 5, a holder 33 may be provided for performing a boring operation, this holder being provided of a size to fit interchangeably in any one of the slots 7, and having a T-shaped inner end 17 with a transverse half-round threaded groove 18 for cooperation with the screw 11 in any one of the slots in the same way as any one of the tool holders 8—10. The body 34 of this holder 33 is of greater length than either of the holders 8—10 to permit the desired range of adjustment of the boring bit 35 lengthwise of the holder, the latter having an axial threaded bore 36 and diametrically opposed, longitudinally extending slots 37 provided therein, and having two screws adjustable in the bore to support and lock the bit 35 in whatever position is desired, adjusted lengthwise and also radially relative to the holder.

It is believed the foregoing description conveys a good understanding of all of the objects and advantages of my invention. The appended claim is drawn with a view to covering all legitimate modifications and adaptations.

I claim:

A turning head comprising a cylindrical main body having a radial T-slot receiving a radially adjustable tool holder, said tool holder comprising a T-shaped body fitting slidably in the slot, a socket in said body for mounting the tool or cutter, the main body having a half-round smooth recess provided therein in the base of the T-slot and on the radial center line thereof and the tool holder body having a registering half-round threaded recess provided therein in the T-shaped inner end thereof, a radial adjusting screw rotatable in the first recess and adapted to be turned at its outer end and threaded in the threads in the second recess, said screw having means providing an annularly projecting thrust shoulder thereon near the outer end thereof which is rotatably received in a half-round groove provided therefor in said main body concentric with said first recess, gibs in said slot in front of the cross-portion of the tool holder body and taking up most of the space left in the cross-portion of the slot on opposite sides of the tool-holder, and screws threaded in holes provided in the main body from the front end and engaging the front faces of the gibs to clamp the tool holder in adjusted position in the slot and thereby simultaneously clamp the adjusting screw against turning from its adjusted position, one of the screws associated with each gib having a reduced coaxial extension on its inner end fitting freely in a registering hole provided therefor in the gib, whereby to prevent endwise displacement of the gib from the slot when the gib screws are loosened to permit adjustment of the adjusting screw.

BAYARD C. DAVIS.

REFERENCES CITED

The following references are of record in the file of this patent:

UNITED STATES PATENTS

| Number | Name | Date |
|---|---|---|
| 671,252 | Weatherby | Apr. 2, 1901 |
| 930,075 | Kern | Aug. 3, 1909 |
| 1,244,665 | Watson | Oct. 30, 1917 |
| 2,211,596 | Darrish | Aug. 13, 1940 |
| 2,305,737 | Richards | Dec. 22, 1942 |
| 2,375,295 | Fenosa | May 8, 1945 |
| 2,416,774 | Rosenblatt | Mar. 4, 1947 |